(12) United States Patent
Reitmeier

(10) Patent No.: US 8,091,688 B2
(45) Date of Patent: Jan. 10, 2012

(54) METHOD AND DEVICE FOR ACTUATING A PARKING BRAKE

(75) Inventor: Willibald Reitmeier, Hohenschambach (DE)

(73) Assignee: Continental Automotive GmbH, Hannover (DE)

( * ) Notice: Subject to any disclaimer, the term of this patent is extended or adjusted under 35 U.S.C. 154(b) by 466 days.

(21) Appl. No.: 12/303,063

(22) PCT Filed: May 31, 2007

(86) PCT No.: PCT/EP2007/055276
§ 371 (c)(1),
(2), (4) Date: Dec. 1, 2008

(87) PCT Pub. No.: WO2007/138087
PCT Pub. Date: Dec. 6, 2007

(65) Prior Publication Data
US 2009/0186744 A1    Jul. 23, 2009

(30) Foreign Application Priority Data
Jun. 1, 2006 (DE) .......................... 10 2006 025 704

(51) Int. Cl.
*F16D 65/36* (2006.01)
(52) U.S. Cl. ........................................ 188/2 D; 188/156
(58) Field of Classification Search .................. 188/2 D, 188/72.6, 72.8, 156; 74/502.4, 501.5 R
See application file for complete search history.

(56) References Cited

U.S. PATENT DOCUMENTS

| 4,906,971 | A | 3/1990 | Schmid et al. | |
| 5,590,744 | A * | 1/1997 | Belmond | 188/265 |
| 5,950,381 | A | 9/1999 | Stansbie | |
| 6,397,981 | B1 * | 6/2002 | Tamasho et al. | 188/71.9 |
| 6,522,967 | B1 * | 2/2003 | Pfeil et al. | 701/70 |
| 6,533,082 | B2 * | 3/2003 | Gill et al. | 188/156 |
| 7,441,632 | B2 | 10/2008 | Tachiiri et al. | |
| 7,559,410 | B2 * | 7/2009 | Funk et al. | 188/2 D |
| 2003/0108476 | A1 | 6/2003 | Woerner | |
| 2004/0026989 | A1 | 2/2004 | Suzuki et al. | |
| 2005/0189183 | A1 * | 9/2005 | Gil et al. | 188/2 D |
| 2006/0001316 | A1 * | 1/2006 | Tachiiri et al. | 303/191 |
| 2006/0151260 | A1 * | 7/2006 | Drennen et al. | 188/72.1 |

FOREIGN PATENT DOCUMENTS

| DE | 87 01 812 | 5/1987 |
| DE | 36 20 092 | 3/1988 |
| DE | 41 19 214 | 12/1991 |
| DE | 296 22 787 | 7/1997 |
| DE | 100 25 729 | 10/2001 |
| DE | 103 35 671 | 3/2004 |

(Continued)

*Primary Examiner* — Christopher Schwartz
(74) *Attorney, Agent, or Firm* — Cozen O'Connor

(57) ABSTRACT

Presented is a method for actuating a parking brake for a vehicle wheel. The parking brake includes a drive, a force transmitting device, and a device for sensing an application force component of the parking brake. The method includes minimizing friction losses and ageing losses of the force transmitting device, and sensing the application force component of the parking brake by performing a force measurement directly on the drive. Also presented is a device for actuating a parking brake for a motor vehicle wheel. The device includes a drive, a force transmitting device, and a device for sensing an application force component of the parking brake. The device for sensing the application force component includes a device for minimizing the friction losses and ageing losses of the force transmitting device, and a device for measuring force directly on the drive.

12 Claims, 1 Drawing Sheet

FOREIGN PATENT DOCUMENTS

| | | |
|---|---|---|
| DE | 103 56 096 | 6/2005 |
| DE | 10 2004 015 729 | 10/2005 |
| DE | 10 2005 030 328 | 3/2006 |
| DE | 10 2004 059 688 | 6/2006 |
| DE | 10 2005 013 705 | 9/2006 |
| EP | 0 809 061 | 11/1997 |
| EP | 0 899 697 | 3/1999 |
| WO | WO 2005/008839 | 1/2005 |

\* cited by examiner

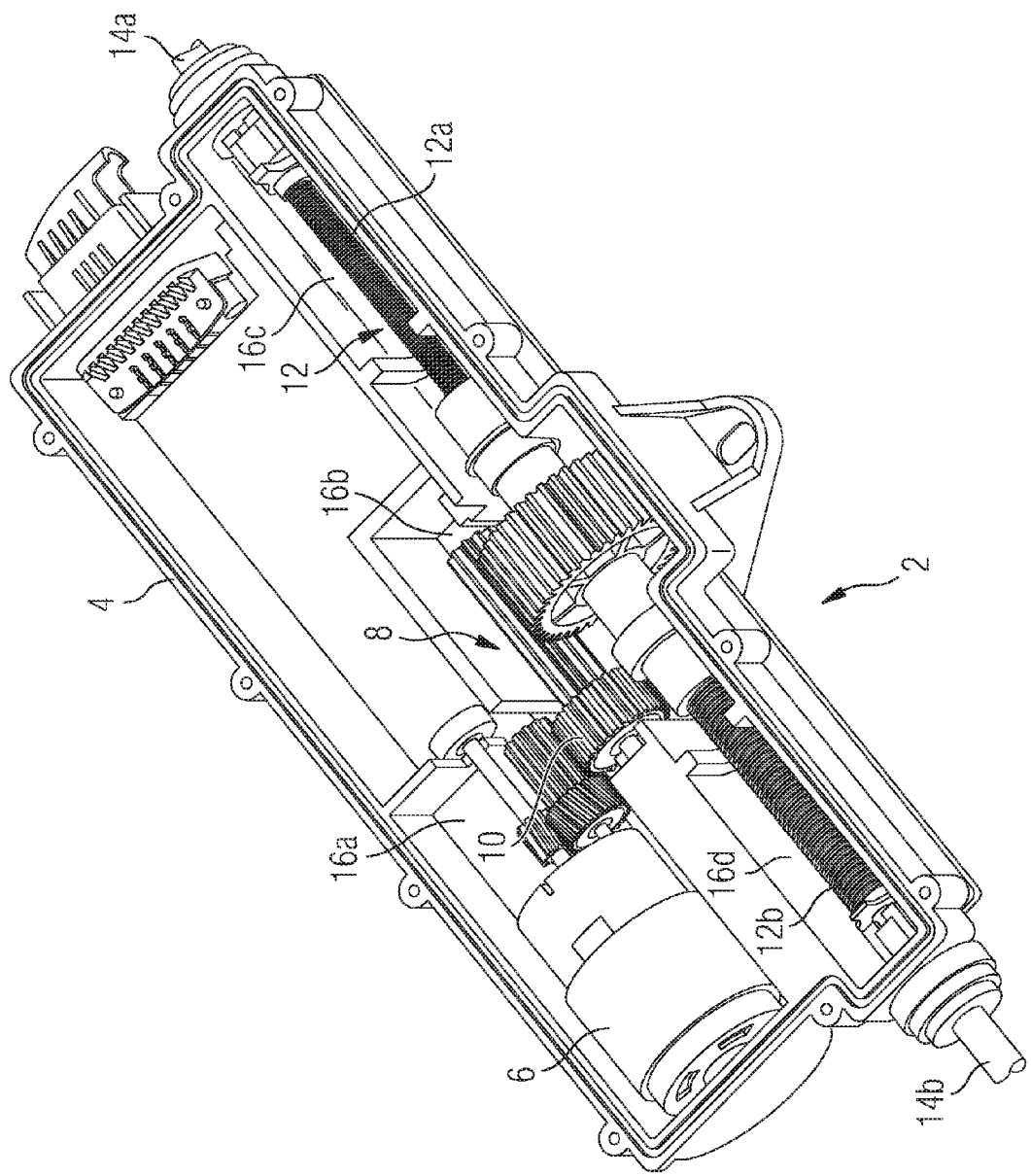

METHOD AND DEVICE FOR ACTUATING A PARKING BRAKE

CROSS-REFERENCE TO RELATED APPLICATION

This is a U.S. national stage of International Application No. PCT/EP2007/055276, filed on 31 May 2007, which claims priority to German Application No. 10 2006 025 704.9, filed on 1 Jun. 2006, the contents of both are incorporated herein by reference.

BACKGROUND OF THE INVENTION

1. Field of the Invention

The invention relates to a method and a device for actuating at least one parking brake for a vehicle wheel.

2. Description of the Related Art

Actuation devices for parking brakes (foundation brakes) which are embodied as electric parking brakes (EPB) with cable pull actuation (cable puller) respectively comprise a drive in the form of an electric motor and a force transmitting device in the form of a gear mechanism, a spindle drive and a cable pull arrangement. The actuation device is also usually provided with a device for sensing the application force component of the parking brake. This device is generally composed of a separate sensor in the form of, for example, a thick film sensor which directly senses the application force component, or a displacement sensor which determines the application force component indirectly by means of a displacement measurement. The sensor is either arranged at the output of the spindle drive of the force transmitting device or on the parking brake itself.

SUMMARY OF THE INVENTION

The present invention is based on the object of providing a method and a device for actuating at least one parking brake for a motor vehicle wheel, in which method and device a different, in particular simpler, possible way of sensing the application force component of the parking brake is provided.

The invention provides that friction losses and ageing losses of the force transmitting device of the parking brake are minimized and, in order to sense the application force component of the parking brake, a force measurement is performed directly on the drive or by means of the drive of the parking brake.

In principle, the application force of the parking brake could be sensed by sensing the drive force of the drive, for example by measuring the current of the electric motor. However, this is impeded by the fact that the efficiency of the force transmitting device changes considerably in the course of its lifetime, in particular owing to the abrasion in the gear mechanism and spindle drive, which would have a correspondingly adverse effect on the accuracy of the sensing of forces. Although the components of the force transmitting device are wetted when they are installed with lubricant, it is possible, over a relatively long service life, for the lubrication film to tear off or to be lost completely so that the level of inaccuracy during the sensing of the application force component can reach double digit percentages.

For this reason, according to the invention, the friction losses and ageing losses of the force transmitting device are minimized. This is preferably done by virtue of the fact that at least part of the force transmitting device is surrounded by a fluidtight casing and the fluidtight casing is filled with lubricant in order to rinse the respective part of the force transmitting device continuously and homogenously with lubricant. In this way, the mechanical influences of the ageing can be kept negligible, in particular in the region of the gear mechanism and of the spindle drive.

The force measurement can then be performed directly on the drive or by means of the drive. According to one possibility, a corresponding sensor is arranged on the drive. According to the other possibility, direct sensing of the energy fed to the drive or of a variable which can be derived therefrom, for example by measuring the current which is fed to a drive which is embodied as an electric motor.

In the last-mentioned case, it is possible to dispense with a separate sensor. A further advantage of the invention is that the wear of the components of the force transmitting device is minimized. This permits, if appropriate, the dimensions of the mechanical components to be reduced and allows an overall more compact design.

A further advantage of the invention is that the lubricant which rinses the components of the force transmitting device ensures considerable damping of the system both in terms of mechanical vibrations and in terms of the generation of noise, which can be promoted through a corresponding selection of the lubricant. Both liquid and solid lubricants are possible as the lubricant.

The actuation device can, of course, be configured either for an individual brake or for a plurality of brakes, in particular two brakes. The adjustment methods, which are provided in the prior art, for the purpose of compensating for the wear of the parking brake can, of course, also be provided in the actuation device for the parking brake which is embodied according to the invention.

BRIEF DESCRIPTION OF THE DRAWINGS

The invention is explained in greater detail below with reference to the attached drawing which is an illustrative perspective plan view of a actuation device (cable puller) for two parking brakes.

DETAILED DESCRIPTION OF THE PREFERRED EMBODIMENTS

The actuation device 2 which is illustrated in the FIGURE is composed of what is referred to as a cable puller for actuating an electric parking brake (EPB) with two individual wheel parking brakes (not shown) for two wheels of a motor vehicle. As illustrated, the actuation device 2 has a housing 4 which is normally closed off by a lid (not shown).

A drive 6 in the form of an electric motor and part of a force transmitting device 8 are arranged within the housing. The force transmitting device 8 is composed of a gear mechanism 10, a spindle drive 12 with a right-hand side spindle 12a and a left-hand side spindle 12b and a cable pull arrangement with a right-hand side cable 14a and a left-hand side cable 14b in order to transmit the drive force from drive 6 to the two wheel parking brakes (not shown). Since the design and the method of functioning of such a cable puller are known, more details are not given on them here.

The gear mechanism 10 and the spindle drive 12 are arranged in chambers 16a, 16b, 16c and 16d of the housing 4. According to the invention, these chambers are embodied in such a way that they form a fluidtight casing of the respective components of the force transmitting device 8. This fluidtight casing is filled with a lubricant in liquid or solid form so that the respective components of the force transmitting device are rinsed continuously and homogenously by the lubricant. The chambers 16a, 16b, 16c and 16d can be embodied separately from one another or connected directly to one another. Moreover, the cables 14*a*, 14*b*, embodied, for example, as Bowden cables, of the cable arrangement can also be filled with lubricant.

As has already been explained at the beginning, the lubricant filling of the respective fluidtight casing ensures that the friction losses and ageing losses on the mechanical force transmitting path between the drive 6 and the wheel parking brakes are minimized. The essential factor here is that the efficiency of the force transmitting device 8 is virtually unchanged over the service life of the actuation device 2.

This permits the sensing of the application force component of the wheel parking brakes to be performed on the drive 6 or by means of the drive 6 itself instead of, as in the prior art, at the output of the spindle drive 12.

One possible way of doing this is for a corresponding sensor (not shown) to be arranged on the drive 6. It is then possible, in contrast to the prior art, for the sensor to be affixedly arranged, which correspondingly simplifies the sensor embodiment.

According to a further possibility, the force measurement is performed directly by means of the drive 6 itself. This is preferably done by measuring the electric current fed to the drive 6 (electric motor), even if other operating variables of the drive 6, such as for example its torque, can also be sensed. A separate sensor is then no longer necessary.

Since the efficiency of the force transmitting device is virtually unchanged in the actuation device embodied according to the invention by virtue of the rinsing of the respective force transmitting components with lubricant, the application force component acting at the parking brake can be sensed with a high level of accuracy by the force sensing on the drive 6 or by means of the drive 6. This provides the advantages described at the beginning.

The illustrated actuation device 2 is configured for two wheel parking brakes. However, it is of course also possible for the invention to be used with actuation devices which are configured for an individual parking brake or for more than two parking brakes. It is also possible to have an actuation device in which the force is transmitted from a common spindle drive to a single cable which then branches into two or more separate cables for actuating two or more wheel parking brakes.

A lubricant which ensures optimum damping of the part of the force transmitting device which is rinsed by the lubricant is preferably selected as the lubricant. This damping has favorable effects both on mechanical vibrations (shocks) and on the generation of noise of the actuation device. As already mentioned, both liquid and solid lubricants are possible.

In conventional actuation devices for such parking brakes, recalibration (zero point setting) is carried out by actuating the parking brake and switching off the actuation when a predefined application force is reached. The present invention provides a simple possible way of monitoring and adjusting the recalibration (zero point setting) over the service life by virtue of the fact that the friction in the force transmitting path between the drive and brake is sensed. For this purpose, a section of the actuation of the drive which is without braking force is used to sense the friction in the force transmitting path. This is possible, for example, when the brake is released or when the brake is pulled on during a neutral travel distance before the brake is engaged, since during this section of actuation of the drive no application force is applied to the brake.

As already mentioned above, by virtue of the invention a force sensor can be dispensed with, the wear on the force transmitting device can be minimized, the dimensions of the mechanical components can be reduced, the design can be made more compact and the force transmitting device can be damped to an optimum degree.

What is claimed is:

1. A device for actuating at least one parking brake for a motor vehicle wheel, comprising:
   a drive;
   a force transmitting device;
   a device for sensing an application force component of the parking brake;
   means for minimizing the friction losses and ageing losses of the force transmitting device, and means for measuring force directly on the drive or by means of the drive, wherein the means for minimizing the friction losses and ageing losses of the force transmitting device comprise a fluidtight casing surrounding at least part of the force transmitting device, and wherein the fluidtight casing is filled with a lubricant.

2. The device for actuating the at least one parking brake as claimed in claim 1, wherein the force transmitting device comprises a gear mechanism, a spindle drive, and a cable pull, and wherein at least the gear mechanism and the spindle drive are arranged inside the fluidtight casing.

3. The device for actuating the at least one parking brake as claimed in claim 2, wherein the cable pull is filled with lubricant.

4. The device for actuating the at least one parking brake as claimed in claim 3, wherein the cable pull comprises a Bowden cable.

5. The device for actuating the at least one parking brake as claimed in claim 3, wherein the lubricant ensures optimum damping of the respective part of the force transmitting device.

6. The device for actuating the at least one parking brake as claimed in claim 2, wherein the gear mechanism, the spindle drive, the drive, and a chamber are arranged in a common housing, and the gear mechanism and the spindle drive are arranged in the chamber, which forms the fluidtight casing.

7. The device for actuating the at least one parking brake as claimed in claim 1, wherein the means for measuring force directly senses energy fed to the drive or an operational variable of the drive which can be derived from the energy fed to the drive.

8. The device for actuating the at least one parking brake as claimed in claim 7, wherein the drive comprises an electric motor, and wherein the current fed to the electric motor or an operational variable of the electric motor which can be derived from the current fed to the electric motor is sensed.

9. The device for actuating the at least one parking brake as claimed in claim 1, wherein the lubricant ensures optimum damping of the respective part of the force transmitting device.

10. The device for actuating the at least one parking brake as claimed in claim 1, wherein the means for measuring force comprise a sensor disposed on the drive.

11. The device for actuating the at least one parking brake as claimed in claim 1, further comprising calibration means which uses a section of the actuation of the drive which is without braking force to sense the frictional force acting in the device in order to permit a zero point setting when the application force component is being sensed.

12. A method for actuating at least one parking brake for a vehicle wheel, the at least one parking brake comprising a drive, a force transmitting device, and a device for sensing an application force component of the parking brake, the method comprising:

minimizing friction losses and ageing losses of the force transmitting device; and sensing the application force component of the parking brake by performing a force measurement directly on the drive or by means of the drive, wherein the step of minimizing the friction losses and ageing losses of the force transmitting device comprises surrounding at least part of the force transmitting device by a fluidtight casing and filling the fluidtight casing with lubricant to continuously and homogeneously rinse the respective part of the force transmitting device.

* * * * *